United States Patent
Graulich (10) Patent No.: US 10,940,542 B2
(45) Date of Patent: Mar. 9, 2021

(54) CLAMPING BUSHING AND CLAMPING DEVICE

(71) Applicant: Ludwig Ehrhardt GmbH, Laubach (DE)

(72) Inventor: Oliver Graulich, Laubach (DE)

(73) Assignee: LUDWIG EHRHARDT GMBH, Laubach (DE)

( * ) Notice: Subject to any disclaimer, the term of this patent is extended or adjusted under 35 U.S.C. 154(b) by 882 days.

(21) Appl. No.: 15/127,561

(22) PCT Filed: Mar. 18, 2015

(86) PCT No.: PCT/EP2015/000597
§ 371 (c)(1),
(2) Date: Sep. 20, 2016

(87) PCT Pub. No.: WO2015/139838
PCT Pub. Date: Sep. 24, 2015

(65) Prior Publication Data
US 2017/0136551 A1    May 18, 2017

(30) Foreign Application Priority Data

Mar. 21, 2014 (DE) ..................... 10 2014 004 104.2

(51) Int. Cl.
*B23B 31/40* (2006.01)
*B23Q 1/00* (2006.01)
(Continued)

(52) U.S. Cl.
CPC ........ *B23B 31/4013* (2013.01); *B23B 31/402* (2013.01); *B23Q 1/009* (2013.01);
(Continued)

(58) Field of Classification Search
CPC ...... B23Q 1/009; B23Q 1/0081; B23Q 3/082; B23Q 3/183; B23Q 3/18; B23B 31/402; B23B 31/113; B23B 31/201; B23B 31/202
(Continued)

(56) References Cited

U.S. PATENT DOCUMENTS 2,360,054 A   10/1944  Haas
2,497,633 A    2/1950  Shapiro et al.
(Continued)

FOREIGN PATENT DOCUMENTS

CN         1735476          2/2006
CN       101925439 A       12/2010
(Continued)

OTHER PUBLICATIONS

English Abstract of DE10318316.
(Continued)

*Primary Examiner* — Orlando E Aviles
*Assistant Examiner* — Seahee Hong
(74) *Attorney, Agent, or Firm* — Caesar Rivise, PC (57) ABSTRACT

The invention relates to a clamping bushing (21) for clamping in a bore (3) of a component (2), in particular of a workpiece to be clamped, wherein the clamping bushing (21) is radially contracted in a relaxed state such that the clamping bushing (21) can be inserted into the bore (3) and pulled out of the bore (3), whereas the clamping bushing (21) is radially expanded in a stressed state such that the lateral surface of the clamping bushing (21) forms a mechanical connection to the inner wall of the bore (3). According to the invention, the mechanical connection between the lateral surface of the clamping bushing (21) and the inner wall of the bore (3) is positive-locking and consists of a threaded connection. The invention further relates to a (Continued)

corresponding clamping device (1). An essential feature of the invention is also the possibility of being able to exchange the clamping bolt (tension anchor) by means of a bayonet coupling without having to open hydraulic lines and without removing the clamping element from the device.

28 Claims, 10 Drawing Sheets (51) Int. Cl.
*B23Q 3/06* (2006.01)
*B25B 5/06* (2006.01)
*B25B 5/16* (2006.01)

(52) U.S. Cl.
CPC ............... *B23Q 3/06* (2013.01); *B25B 5/061* (2013.01); *B25B 5/163* (2013.01); *B23B 2231/34* (2013.01); *B23B 2260/138* (2013.01)

(58) Field of Classification Search
USPC ....................................... 269/20, 24, 25, 309
See application file for complete search history.

(56) References Cited

U.S. PATENT DOCUMENTS

| | | | |
|---|---|---|---|
| 2,594,429 A | | 4/1952 | Handley |
| 5,026,223 A | * | 6/1991 | Hunt ................. B23B 31/113 408/239 A |
| 5,226,869 A | * | 7/1993 | Thumm ............. B23B 31/113 29/48.5 A |
| 5,647,627 A | | 7/1997 | Baessler |
| 6,095,509 A | * | 8/2000 | Yonezawa ............. B23B 31/202 269/309 |
| 7,303,186 B2 | | 12/2007 | Yonezawa et al. |
| 7,584,971 B2 | | 9/2009 | Weller |
| 9,452,477 B2 | | 9/2016 | Mauch |
| 2006/0049568 A1 | | 3/2006 | Yonezawa et al. |
| 2007/0063454 A1 | | 3/2007 | Weller |
| 2008/0189924 A1 | * | 8/2008 | Yonezawa ............. F15B 15/068 29/256 |
| 2010/0308524 A1 | | 12/2010 | Kitaura et al. |
| 2010/0320664 A1 | * | 12/2010 | Kawakami ............. B23Q 1/009 269/32 |
| 2010/0327503 A1 | | 12/2010 | Kawakami |
| 2011/0031670 A1 | * | 2/2011 | Kawakami ............. B23Q 1/009 269/32 |
| 2015/0021864 A1 | | 1/2015 | Mauch |
| 2015/0165575 A1 | * | 6/2015 | Kaji ....................... B23Q 1/009 269/25 |

FOREIGN PATENT DOCUMENTS

| | | |
|---|---|---|
| DE | 2502561 | 7/1976 |
| DE | 4020981 A1 | 1/1992 |
| DE | 10318316 | 10/2004 |
| DE | 102004025256 A1 | 12/2005 |
| DE | 102007039032 A1 | 2/2009 |
| DE | 202013103278 U1 | 10/2013 |
| DE | 202013007456 U1 | 11/2013 |
| EP | 2594359 A1 | 5/2013 |

OTHER PUBLICATIONS

Office Action of corresponding Chinese Patent Application No. 201910525346.6 dated Apr. 16, 2020.
International Search Report for PCT/EP2015/000597 dated Aug. 20, 2015.

\* cited by examiner

Fig. 13A
Section F-F

Fig. 13B
Section G-G

Fig. 13C

CLAMPING BUSHING AND CLAMPING DEVICE

BACKGROUND OF THE INVENTION

The invention relates to a clamping bushing for clamping in a bore of a component, in particular of a component to be clamped (for example, a workpiece to be machined).

From the prior art, clamping devices are known which have a pneumatically or hydraulically displaceable tension rod (tensioning bolt) which can be introduced with its free end into a corresponding blind bore in the component to be clamped. The free end of the tension rod widens conically toward its end and is surrounded by a clamping bushing which is introduced together with the free end of the tension rod into the blind bore of the component to be clamped. On retraction of the tension rod, the clamping bushing remains initially in its position so that the retraction of the tension rod leads, due to the conical widening of the free end of the tension rod, to a radial expansion of the clamping bushing and thus to a clamping fixing of the component. On a further retraction of the tension rod, the now clamped component can then also carry out a pull-down movement together with the tension rod and the clamping bushing. In the known clamping devices of the aforementioned type, the clamping of the component takes place by means of a frictional connection between the outer envelope surface of the clamping bushing and the inner envelope surface of the blind bore in the component. In this known clamping device, however, the clamping effect is unsatisfactory.

From DE 40 20 981 A1, a clamping bushing for clamping in a bore of a workpiece to be clamped is known, wherein the clamping bushing is spreadable. On its outside, the clamping bushing herein has a toothing which, in the spread state, penetrates into the inner wall of the bore of the workpiece and thereby forms a form-locking connection. A disadvantage thereof is firstly the fact that for producing the form-locking connection, a large radial force must be exerted on the clamping bushing. A further disadvantage lies therein that the workpiece must consist of a softer material than the clamping bushing. Finally, the individual clamping processes lead herein to a deformation of the workpiece at the inner wall of the bore since the toothing must penetrate into the inner wall.

Reference is also made, with regard to the prior art, to DE 20 2013 007 456 U1, DE 10 2007 039 032 A1, US 2006/0049568 A1, DE 10 2004 025 256 A1 and US 2010/0327503 A1.

It is therefore an object of the invention to improve the clamping effect.

This object can be achieved with a clamping bushing according to the invention.

SUMMARY OF THE INVENTION

The invention includes the general technical teaching of providing for clamping a form-locking connection between the outer envelope surface of the clamping bushing and the inner wall of the blind bore in the component to be machined. Advantageous in a form-locking connection of this type for clamping a component are the large maximum clamping forces and the greater reliability of the form-locking connection.

According to the invention, the form-locking connection between the clamping bushing and the component consists of a thread connection. Herein, the outer envelope surface of the clamping bushing has an external thread which engages in a correspondingly adapted internal thread in the inner wall of the blind bore of the component and thereby creates the form-locking connection between the clamping bushing and the component.

In the thread connection between the clamping bushing and the component, the external thread of the clamping bushing and the internal thread of the component preferably have the same thread pitch in order to enable a form-locking thread engagement.

It should be mentioned here that the clamping bushing can be expanded in the radial direction as with the conventional clamping bushing described in the introduction, wherein the clamping bushing does not create any form-locking with the component in the radially contracted state (relaxed state), whereas the clamping bushing engages form-lockingly in the component in the radially expanded state.

The external thread of the clamping bushing therefore typically has, in the radially contracted state, a smaller thread diameter than the internal thread of the bore, so that the clamping bushing can be introduced without difficulty into the blind bore in the component.

In the radially expanded state of the clamping bushing, by contrast, the external thread of the clamping bushing preferably has the same thread diameter as the internal thread of the bore, so that the external thread and the internal thread then engage in one another and form the form-locking connection.

It should also be mentioned that the outer diameter of the external thread (i.e. from tip to tip) of the clamping bushing in the radially contracted state of the clamping bushing is preferably smaller than the core diameter of the internal thread of the bore. This is useful so that the clamping bushing can be introduced in the radially contracted state into the blind bore of the component.

In the radially contracted state, this typically involves a relaxed state of the clamping device, i.e. without any radial expansion by the tension rod. The radially expanded state of the clamping bushing, however, is generally not the normal state of the clamping bushing. Rather, the clamping bushing only assumes the radially expanded state when the clamping bushing is radially expanded by the tension rod.

In a preferred exemplary embodiment of the invention, the radial expansion of the clamping bushing is enabled by a special construction. Herein, the clamping bushing has a plurality of segments which are arranged distributed over the periphery of the clamping bushing. The adjacent segments of the clamping bushing are herein each separated from one another by an axially extending slit, wherein the individual slits each extend, starting from the free end of the clamping bushing at least over part of the axial length of the clamping bushing. This slitted arrangement enables the individual segments of the clamping bushing to rebound in the radial direction in order to enable a radial expansion of the clamping bushing.

It should further be mentioned that the clamping bushing according to the invention, like the conventional clamping bushing, preferably has an axial through bore for the tension rod, wherein the through bore preferably widens radially toward the free end of the clamping bushing, particularly in a conical form. On retraction of the tension rod, the conical envelope surface of the tension rod on one side, and the conical inner wall of the through bore on the other, then slide over one another, which leads to a corresponding radial expansion of the clamping bushing.

It should also be mentioned that the invention does not only claim protection for the above-mentioned clamping bushing according to the invention as an individual component. Rather, the invention also claims protection for a complete clamping device for mechanical clamping of a component.

The clamping device according to the invention comprises an axially displaceable tension rod (tensioning bolt) for clamping the component, the functioning of a tension rod of this type having been described above.

The clamping device according to the invention further comprises an axially displaceable piston for displacement of the tension rod, wherein the piston can be driven, for example, hydraulically, pneumatically, by electric motor or manual-mechanically.

In a preferred exemplary embodiment of the clamping device according to the invention, the clamping device has a clamping bushing according to the invention, as described above, wherein the tension rod extends axially through the clamping bushing and has a radial widening at its free end, so that the tension rod radially expands the clamping bushing on retraction of the tension rod. Thus the clamping bushing produces a form-locking connection—as described above—between the clamping bushing and the blind bore in the component to be clamped.

However, the invention is not restricted only to clamping devices with clamping bushings which create a form-locking connection to the component to be clamped. Rather, the invention also covers clamping devices with clamping bushings which create a frictional connection in a conventional manner to the blind bore in the component to be clamped. The invention is therefore applicable for components with cylindrical blind bores, conical blind bores or blind bores with an internal thread.

In the preferred exemplary embodiment of the invention, the tension rod is releasably anchored in the piston by a bayonet fastening. This means that the tension rod can be introduced into the clamping device or removed therefrom from in a particular rotary position in relation to its longitudinal axis. The anchoring of the tension rod then takes place in the introduced state in that the tension rod is rotated about its longitudinal axis, for example by 90°. Advantageous with such a bayonet fastening for the tension rod is the fact that for the exchange of the tension rod, no disassembly of the clamping device is required. Furthermore, in this way the tension rod can be exchanged directly at the clamping device. It should be mentioned herein that the exchange of the tension rod can preferably take place without impeding fluid lines (e.g. hydraulic lines) for driving the piston, so that on exchange of the tension rod, the risk does not arise that hydraulic fluid will leak out.

In the preferred embodiment of a bayonet fastening of this type, the tension rod has a hammer-shaped lateral widening at its lower end. Furthermore, the piston and also the clamping device per se have an axial bore through which the tension rod can be introduced. This axial bore in cross-section is a slot, so that the tension rod can be introduced despite the hammer-shaped lateral widening.

It should further be mentioned that for the bayonet fastening, a first spring is preferably provided which biases the tension rod in order to prevent the tension rod falling out of the clamping device.

In a preferred exemplary embodiment of the invention, between the tension rod and the piston, the bayonet fastening has a rotation angle limitation which delimits the rotation angle of the tension rod. Preferably, this rotation angle limitation acts in each rotation direction and for this purpose has a rotation angle stop in each case. For example, the rotation angle stop can consist of a post which is inserted into a corresponding bore in the piston.

Furthermore, the bayonet fastening preferably has an antitwist protection in order to prevent unintended release of the bayonet fastening. For example, this antitwist protection can have a rotation angle stop which prevents the tension rod being able to rotate independently into a position which allows a release of the bayonet fastening and therefore a retraction of the tension rod. Herein also, the rotation angle stop can comprise, for example, a pin which is inserted into a corresponding bore in the piston.

It was briefly mentioned above that the piston and thus also the tension rod is preferably hydraulically or pneumatically driven. The clamping device according to the invention therefore preferably has two pressure chambers, specifically a first pressure chamber for hydraulic or pneumatic pressure application on the piston for clamping the tension rod and a second pressure chamber for hydraulic or pneumatic pressure application on the piston for relaxation of the tension rod. The first pressure chamber for clamping the tension rod is typically arranged above the piston and presses the piston and therefore also the tension rod downwardly. The second pressure chamber for relaxation of the tension rod however is preferably arranged under the piston and therefore presses the piston upwardly for relaxation.

In a preferred exemplary embodiment of the invention, the clamping device comprises a so-called intrinsic safety system which ensures, on a pressure loss, that the component remains clamped. For this purpose, a second spring can be provided which biases the piston and thus also the tension rod in the clamping position. As a rule, the second spring pulls the piston and thus also the tension rod downwardly, such that the clamping bushing is radially expanded and thus creates a frictional and/or form-locking connection to the component to be clamped.

Preferably, the clamping device according to the invention also comprises an enquiry device for testing the state of the clamping device. For example, the enquiry device can recognize the following states of the clamping device:
  breakage of the tension rod,
  breakage of the clamping bushing,
  seating or absence of a component on the clamping device (seating monitoring), and
  axial position of the tension rod or the piston,
  device relaxed (tension rod and piston in relaxed position),
  bore in workpiece too large (piston then moves into the bottom position).

In the preferred exemplary embodiment of the invention, such an enquiry device operates pneumatically. For this purpose, the enquiry device can blow compressed air out of the seating area of the clamping device. On seating of a component on the seating area, the component then blocks the exit opening, which is expressed in a corresponding change of pressure and flow and is therefore detectable with sensing technology.

Furthermore, the compressed air from the enquiry device can also be fed into the cylinder in which the piston is displaceable. This enables detection of the piston position since the piston can unblock the bore, for example, in the maximally clamped state or on a breakage of the tension rod, which is expressed in a corresponding change of pressure or flow of the compressed air and is therefore detectable with sensing technology.

The clamping device according to the invention preferably further comprises an air purge apparatus for blowing out purge air in the region of a seating round the free end of the tension rod. The purge air is intended to ensure that the seating region of the clamping device remains clean.

Furthermore, the compressed air from the purge air device can also be fed into the cylinder in which the piston is displaceable. In the relaxed position, the pressure rises in this line due to the throttle present. This enables an enquiry of the relaxation position. The workpiece can thus be removed from the device. In the clamped position, the air also passes via the bores 48 and 52 (see FIGS. 4 and 5) with a larger volume (pressure difference is measurable).

Furthermore, the clamping device according to the invention preferably has an elastic centring element in order to bring about a pre-centring of the tension rod in the clamping device. In the preferred exemplary embodiment of the invention, the centring element is an elastic O-ring which surrounds the tension rod in an annular manner so that a radial yielding of the tension rod leads to a centring counter-force through the O-ring. In one variant of the invention, the centring element (e.g. O-ring) is herein arranged under the clamping bushing and surrounds only the tension rod, wherein the centring element lies directly on the envelope surface of the tension rod. In another variant of the invention, however, the centring element (e.g. O-ring) surrounds both the tension rod and also the surrounding clamping bushing so that the centring element lies externally on the clamping bushing.

It should also be mentioned that the clamping device according to the invention can preferably carry out two axial movements, specifically firstly a clamping movement and secondly a pull-down movement. The clamping movement serves exclusively to expand the clamping bushing radially and thereby to create a frictional or form-locking connection between the clamping bushing and the component to be clamped. During the clamping movement, however, the component to be clamped is not yet moved itself. Following the clamping of the component by means of the clamping movement, however, a further axial pull-down movement takes place, wherein the now clamped component is pulled axially against the clamping device in order to set a defined position of the component. To enable such a pull-down movement, the clamping bushing is mounted in the clamping device preferably with an axial play, so that the clamping bushing together with the clamped component can carry out the axial pull-down movement.

Preferably, a third spring is provided herein for biasing the clamping bushing against the pull-down movement. The third spring thus presses the clamping bushing upwardly so that during the pull-down movement, the tension rod must overcome the spring force of the third spring. The third spring provides, during the preceding clamping movement of the tension rod, that the clamping bushing does not move away axially, but is expanded radially. Firstly, the third spring thus offers sufficient resistance so that the clamping bushing does not move away axially on pulling down of the tension rod, but expands radially. Secondly, the third spring is so yielding, however, that the expanded clamping bushing can carry out a pull-down movement together with the clamped component.

In one exemplary embodiment of the invention, the clamping bushing has at the bottom thereof a radially protruding collar, wherein the third spring surrounds the radially protruding collar externally and presses it radially inwardly. The clamping force acting herein on the radially protruding collar and directed inwardly is then converted in the clamping bushing into a corresponding axially directed force which presses the clamping bushing upwardly.

In another embodiment, however, the third spring is arranged under the clamping bushing and presses the clamping bushing axially upwardly.

In an advantageous variant of the invention, the clamping bushing has on its underside a conical ramp surface which narrows conically upwardly. The clamping bushing herein lies with its conical ramp surface on a conical ramp surface fixed in the clamping device and inclined in a complementary manner. The sliding of the conical ramp surfaces on one another then leads in a clamping process to a radial expansion of the clamping bushing and then during the pull-down movement also to an axial downward movement.

BRIEF DESCRIPTION OF SEVERAL VIEWS OF THE DRAWLINGS

Other advantageous further developments of the invention are described below in greater detail together with the description of the preferred exemplary embodiments of the invention, making reference to the drawings, in which.

DETAILED DESCRIPTION OF PREFERRED EMBODIMENTS

Figures 1A, 1B:
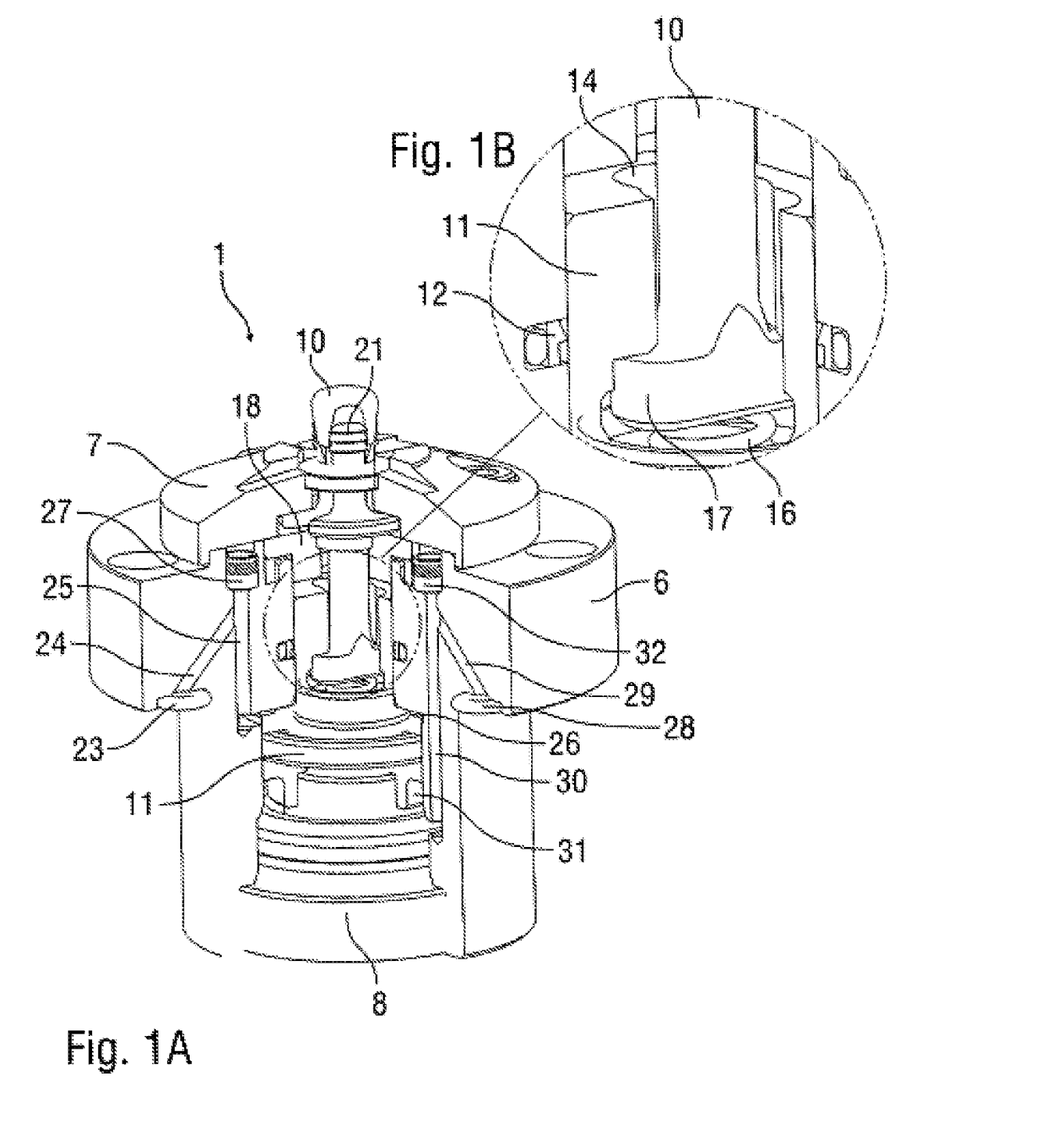
FIG. 1A shows a cut-away perspective view of a clamping device according to the invention.
FIG. 1B shows a detail view of the bayonet fastening of the clamping device of FIG. 1A.
Figure 2:
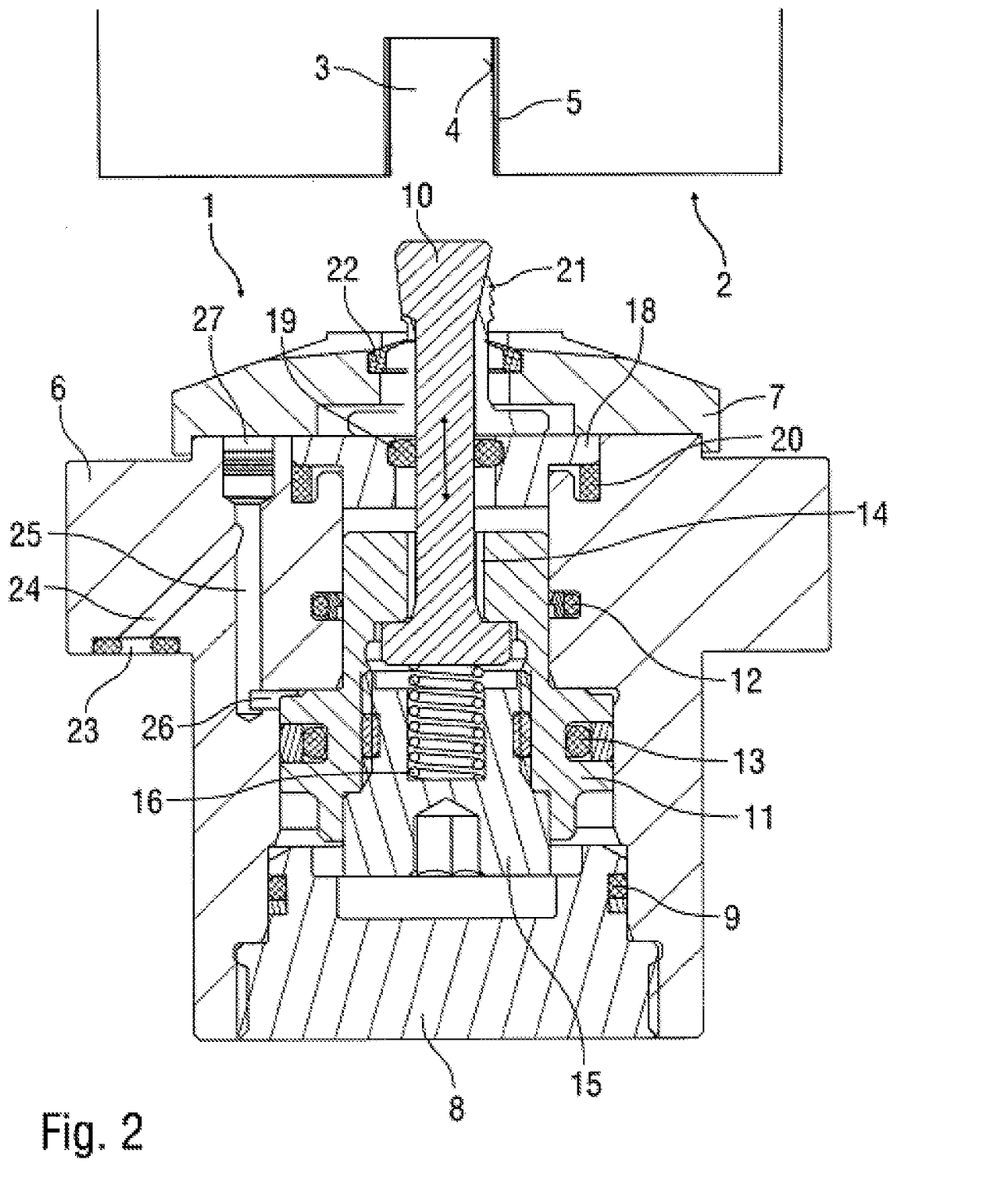
FIG. 2 shows a cross-sectional view of the clamping device of FIGS. 1A and 1B to illustrate the pressure application on the piston during clamping.

FIGS. 1A to 8 show different views of a clamping device 1 according to the invention for clamping a component 2, wherein the component 2 is shown only schematically in FIG. 2 and otherwise is left out for the sake of clarity. The component 2 has a blind bore 3 with an inner wall 4 which is provided with an internal thread 5 for engagement by the clamping device 1 in order to enable a form-locking engagement, as described in detail below.

The clamping device 1 has a housing 6 which is closed upwardly by a housing cover 7 and downwardly by a housing base 8. The annular gap between the housing base 8 and the housing 6 is herein sealed by a seal 9.

Arranged axially displaceable in the clamping device 1 is a tension rod 10, wherein the tension rod 10 can be displaced by an also axially displaceable piston 11, as will also be described in detail below. The annular gap between the outer envelope surface of the piston 11 and the inner wall of the housing 6 is herein sealed by two seals 12, 13.

The piston 11 has an axial through bore 14 through which the lower end of the tension rod 10 is introduced, wherein the tension rod 10 is anchored in the piston 11 by a releasable bayonet fastening, as will be described in detail below.

A piston insert 15 is inserted into the piston 11, wherein a spring 16 which presses the tension rod 10 axially upwardly rests against the base of the piston insert 15, so that the bayonet fastening of the tension rod 10 does not inadvertently become released.

Figure 7:
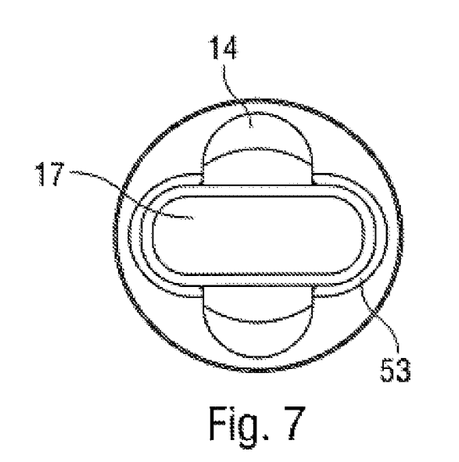
FIG. 7 shows an enlarged detail view in the axial direction of the locked-in tensioning bolt of the bayonet fastening.
Figure 8:
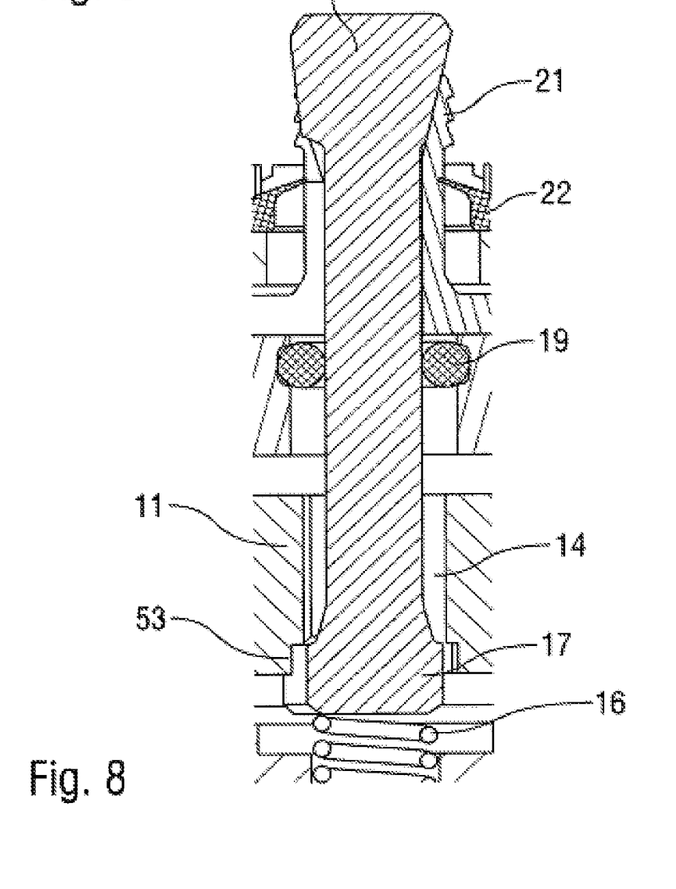
FIG. 8 shows a cross-sectional view to illustrate the bayonet fastening for the tension rod.

The through bore 14 in the piston 11 is herein configured in cross-section as a slot, as shown in FIG. 7. The tension rod 10 has at its lower end a hammer-shaped lateral widening 17 which in the anchored state of the bayonet fastening is supported at the bottom on projections 53 in the piston 11. In a particular angular position, the tension rod 10 can thus be easily introduced into the clamping device 1, since the through bore 14 configured as a slot then offers sufficient space. Following the introduction of the tension rod 10, the tension rod 10 is then rotated through 90°, whereupon the tension rod 10 rests with its hammer-shaped widening 17 against the piston 11.

However, other variants are also possible, for example, a fastening, e.g. via a pivot curve or a stop bolt.

The spring 16 prevents the tension rod 10 rotating unintentionally and then falling out of the clamping device 1 (latching on the projection 53).

Furthermore, the clamping device 1 has, in the upper region, an internal part 18 which surrounds the tension rod 10 in annular manner and contains a through bore in which an O-ring 19 is arranged for pre-centring the tension rod 10. Specifically, on lateral deflection of the tension rod 10, the O-ring 19 exerts an internally directed counter-force, whereby the tension rod 10 is centred in the clamping device 1.

The internal part 18 rests herein via a compression spring 20 on the housing 6. The compression spring 20 thus presses the internal part 18 upwardly.

The free end of the tension rod 10 is surrounded by a clamping bushing 21 wherein on clamping the component 2, the clamping bushing 21 is introduced into the blind bore 3 and then creates a form-locking connection. For this purpose, the clamping bushing 21 has an external thread A'(FIG. 10) at its external envelope surface A (FIG. 10) which is adapted to the internal thread 5 of the blind bore 3.

The free end of the tension rod 10 has an external envelope surface which widens conically toward the end of the tension rod 10 (alternatively pyramid surfaces are also possible). Correspondingly, the clamping bushing 21 also has a conical inner wall which widens conically toward the free end. A retraction of the tension rod 10 into the clamping device 1 thus leads thereto, due to the conical surfaces of the tension rod 10 on one side, and of the clamping bushing 21 on the other, sliding over one another, that the clamping bushing 21 expands radially. The external thread of the clamping bushing 21 then engages in the correspondingly adapted internal thread 5 of the blind bore 3 and creates thereby a form-locking connection.

It should further be mentioned that the clamping bushing 21 is externally surrounded by an annular scraper 22. The scraper 22 prevents dirt being able to penetrate into the clamping device 1.

FIG. 2 shows a cross-sectional view of the clamping device 1 with a hydraulic connection 23 for clamping the tension rod 10. The hydraulic connection 23 is linked via oil channels 24, 25 to a pressure chamber 26, wherein the hydraulic pressure acting in the pressure chamber 26 presses from above onto the piston 11 and pushes the piston 11 downwardly, if needed. The piston 11 then correspondingly carries the tension rod 10 downwardly with it. Furthermore, it should herein be mentioned that the oil channel 25 is closed at its upper side by a plug 27.

Figure 3:
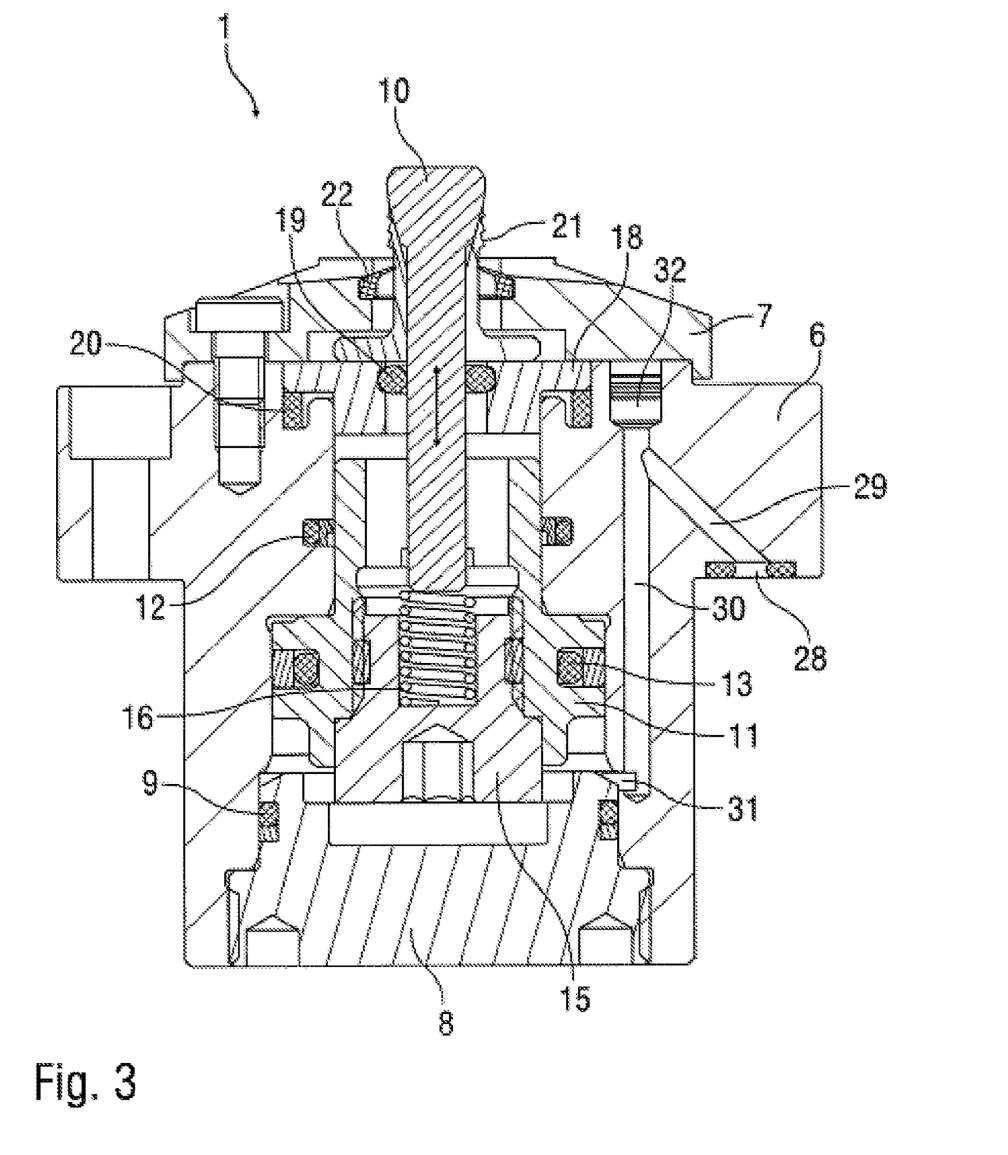
FIG. 3 shows a cross-sectional view of the clamping device of FIGS. 1A and 1B to illustrate the pressure application on the piston during relaxation.

FIG. 3 shows another cross-sectional view of the clamping device of FIGS. 1A and 1B with a hydraulic connection 28 for relaxing the clamping device 1. The hydraulic connection 28 is linked via oil channels 29, 30 to a pressure chamber 31, wherein the oil pressure prevailing in the pressure chamber 31 acts from below on the piston 11 and pushes the piston 11 upwardly, if needed. It should herein be mentioned that the oil channel 30 is also closed at its upper side by a plug 32.

Figure 4:
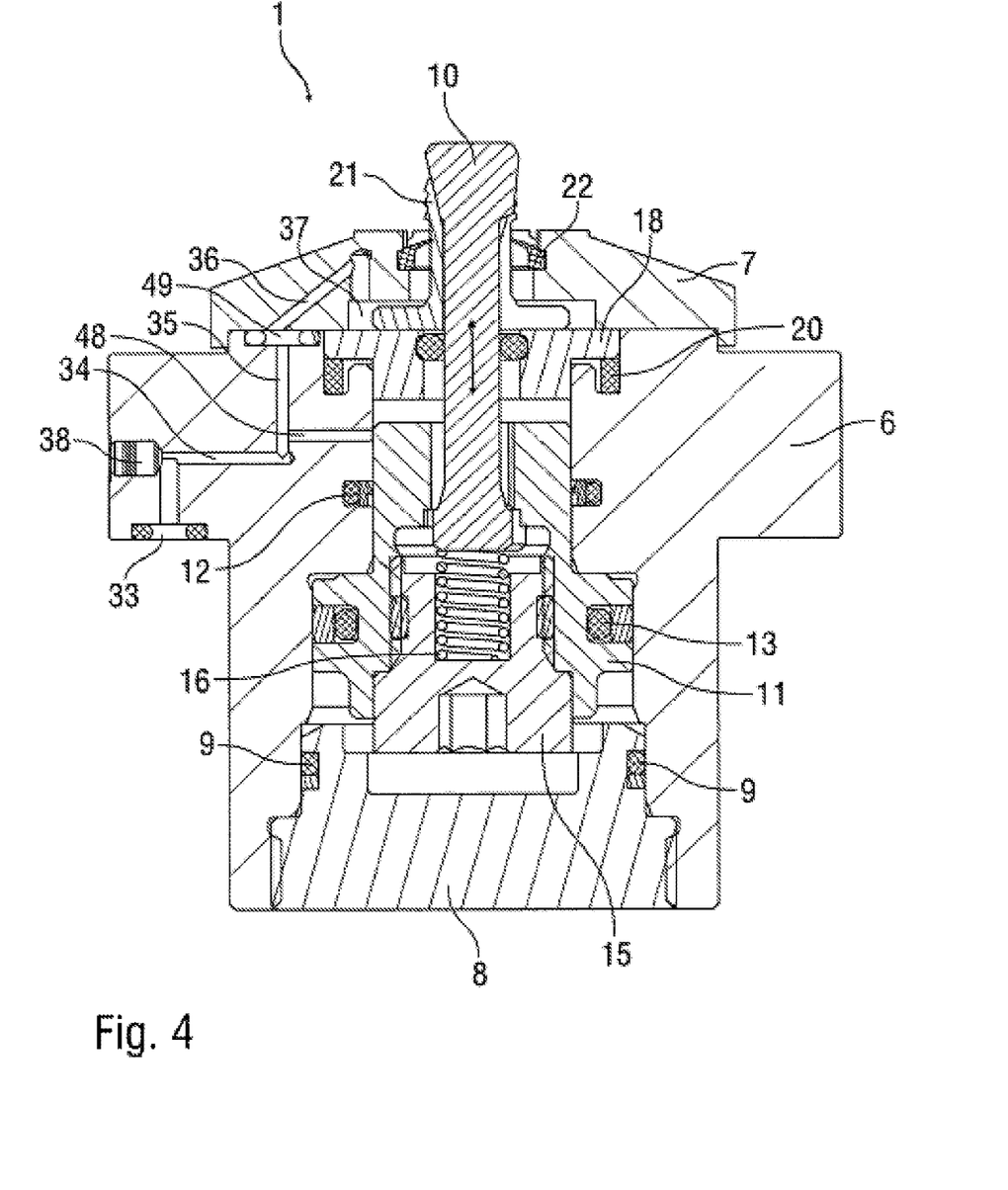
FIG. 4 shows a further cross-sectional view of the clamping device of FIGS. 1A and 1B to illustrate the blowing out of purge air from the clamping device and to illustrate an enquiry of the relaxation position with a throttle (message: workpiece can be removed)

FIG. 4 shows a further cross-sectional view of the clamping device 1 with a further pneumatic connection 33 for a purge air device and an enquiry of the relaxation position of the piston 11. The pneumatic connection 33 is linked via compressed air channels 34, 35, 36, 48 to a pressure chamber 37 in the housing cover 7, from where the compressed air can be blown out upwardly through blow-out openings in order to keep the seating region of the clamping device 1 clean. It should herein be mentioned that the compressed air channel 34 is also closed externally by a plug 38.

A throttle 49 ensures a pressure difference. In the relaxed state, the piston 11 in its upper position and the compressed air channel 48 (purge air channel) are closed, i.e. a pressure difference comes about between the clamped and relaxed position.

Figure 5:
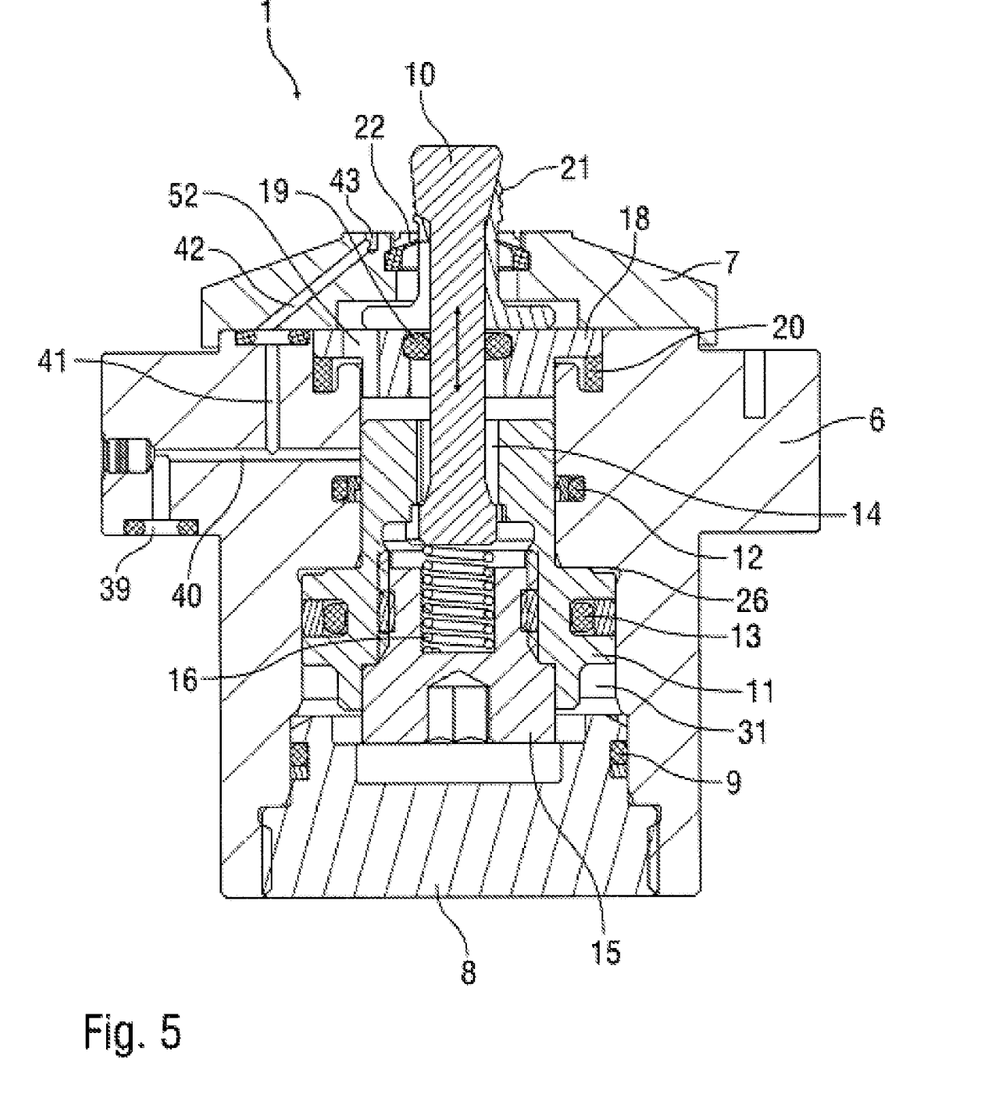
FIG. 5 shows a further cross-sectional view of the clamping device of FIGS. 1A and 1B to illustrate a pneumatic enquiry device.

FIG. 5 shows a further cross-sectional view of the clamping device 1 with a further pneumatic connection 39 for a pneumatically operating enquiry device.

The pneumatic connection 39 of the enquiry device opens firstly via a pressure channel 40 into the cylinder in which the piston 11 is axially displaceable. In this way, the position of the piston 11 can be interrogated by the enquiry device, since the pressure conditions change at the pneumatic connection 39 if the piston 11 unblocks the outlet opening of the compressed air channel 40.

Secondly, however, the pneumatic connection 39 of the enquiry device also opens via compressed air channels 41, 42 into a seating monitoring bore 43 which in the clamped state is closed by the component 2, whereby the pressure conditions at the pneumatic connection 39 change, which can be sensed with measuring technology and thereby enables a seating monitoring.

The functioning of the clamping device 1 according to the invention will now be described.

Herein, it is assumed that the tension rod 10 is already mounted in the clamping device 1 and is anchored by means of the bayonet fastening. The spring 16 then presses the tension rod 10 upwardly against the piston 11 and thereby prevents the bayonet fastening becoming loosened, for example by vibrations or shaking, which in the worst case could lead to falling out of the tension rod 10 (engaging on the projection 53).

The clamping device 1 is then firstly relaxed in that by means of the hydraulic connection 28, oil is fed in and then acts in the pressure chamber 31 from below onto the piston 11 and presses the piston upwardly together with the tension rod 10. During this relaxation of the clamping device, the hydraulic connection 23 is pressure-free.

Subsequently, the component 2 can then be placed so that the free end of the tension rod 10 is introduced with the clamping bushing 21 into the blind bore 3.

It should herein be mentioned that the clamping bushing 21 has an outer diameter in the relaxed state which is smaller than the inner diameter of the inner wall 4 of the blind bore 3. This is important so that the tension rod 10 with the clamping bushing 21 can be introduced in the relaxed state into the blind bore 3.

Following the placement of the component 2 onto the clamping device 1, the component 2 closes the seating monitoring bore 43 on the upper side of the clamping device 1, which is measurable at the pneumatic connection 39.

Thereupon, the clamping device 1 is clamped. For this purpose, the hydraulic connection 28 is made pressure-free. Furthermore, the pressure connection 23 is controlled so that the oil pressure in the pressure chamber 26 pulls the piston 11 downwardly together with the tension rod 10. With this downward movement of the tension rod 10, the conical surfaces of the tension rod 10 and of the clamping bushing 21 slide over one another, which leads to a radial expansion of the clamping bushing 21. During this radial expansion of the clamping bushing 21, the external thread in the envelope surface of the clamping bushing 21 then engages in the internal thread 5 in the inner wall 4 of the blind bore 3 and thus creates a form-locking connection between the clamping bushing 21 and the component 2.

On a further downward movement of the tension rod 10, the now form-lockingly clamped component 2 then carries out a pull-down movement in order to pull the component 2 firmly against the seating area of the clamping device 1. It should herein be mentioned that the clamping bushing 21 lies with its underside on the internal part 18. A further pulling-down of the tension rod 10 thus leads to a corresponding downward movement of the clamping bushing 21 and thus also of the internal part 18, which rests against the compression spring 20. The pull-down movement must therefore overcome the counterforce of the compression spring 20.

The enquiry device can determine by querying the pressure conditions at the pneumatic connection 39 whether the component 2 is firmly pulled against the seating area of the clamping device 1, whereupon the clamping process is then ended.

Figure 6:
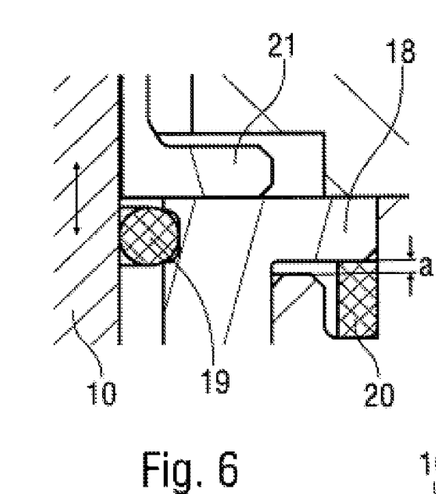
FIG. 6 shows an enlarged detail view of FIG. 2 to illustrate the axial play of the clamping bushing as a precondition for a pull-down movement.

It is clear from FIG. 6 that the internal part 18 and thus also the clamping bushing 21 is mounted in the clamping device 1 with an axial play a, in order to enable the pull-down movement after the clamping of the component 2.

Figure 9:
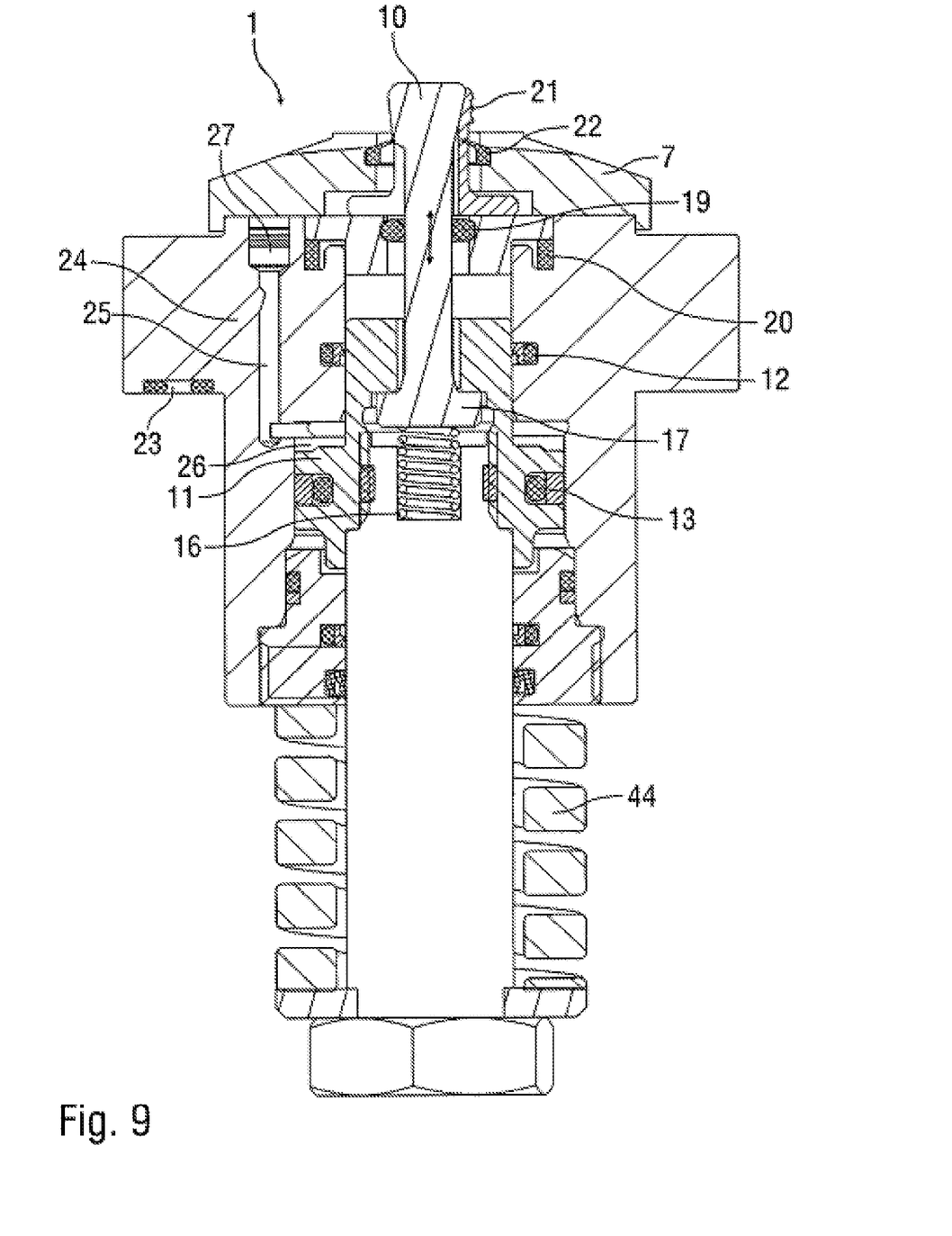
FIG. 9 shows a modification of the exemplary embodiment according to FIGS. 1A to 8 with an additional spring for intrinsic safety.

FIG. 9 shows a modification of the exemplary embodiment described above, wherein this exemplary embodiment largely matches that described above so that, for the avoidance of repetition, reference is made to the above description, wherein the same reference signs are used for corresponding details.

A peculiarity of this exemplary embodiment lies therein that the clamping device 1 comprises a so-called intrinsic safety system. This means that the component 2 remains clamped even in the event of a pressure loss. For this purpose, an additional spring 44 is provided which pulls the piston 11 and thus also the tension rod 10 downwardly into the clamping position.

Figure 10:
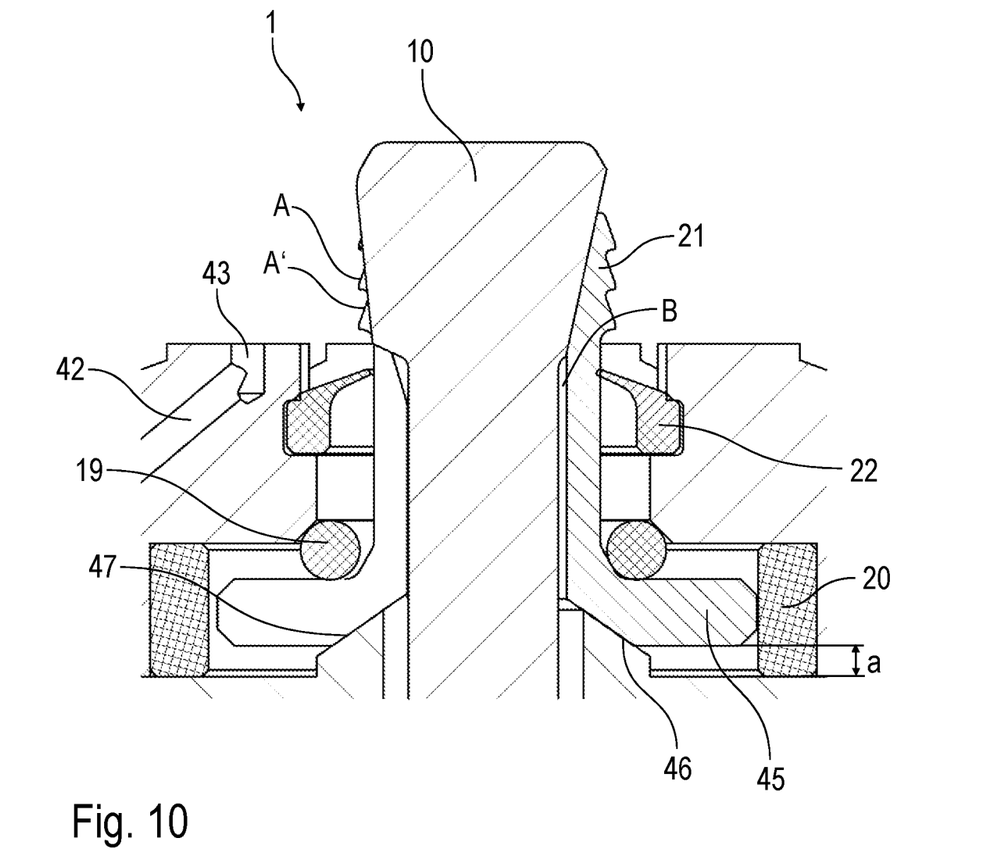
FIG. 10 shows a modification with a conical ramp surface at the clamping bushing for radial expansion of the clamping bushing.

Finally, FIG. 10 shows a further modification which also largely corresponds to the exemplary embodiments described above so that, for the avoidance of repetition, reference is made to the above description, wherein the same reference signs are used for corresponding details.

A peculiarity of this exemplary embodiment lies therein that the clamping bushing 21 comprises at its underside a radially protruding collar 45 and a conical ramp surface 46 which can slide on a conical ramp surface 47 of the clamping device. On a pull-down movement, the conical ramp surfaces 46, 47 therefore slide over one another so that the radially protruding collar 45 deflects outwardly, against the radially directed counterforce of the compression spring 20, which permits the pull-down movement. The clamping bushing includes centrally an axial through bore B for the tension rod 10.

Figure 11:
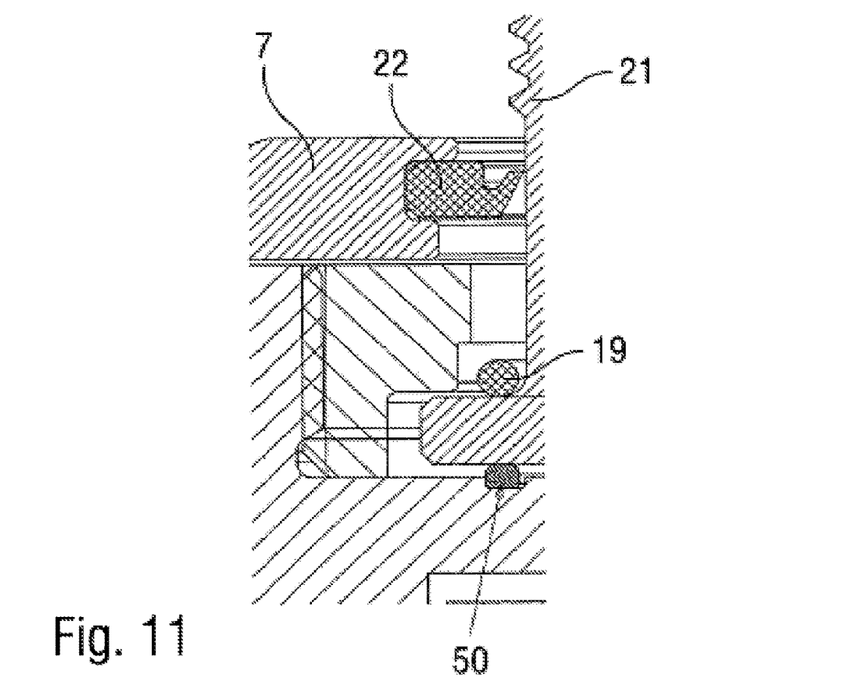
FIG. 11 shows a modification with an elastic ring for facilitating the insertion of the thread.
Figure 12:
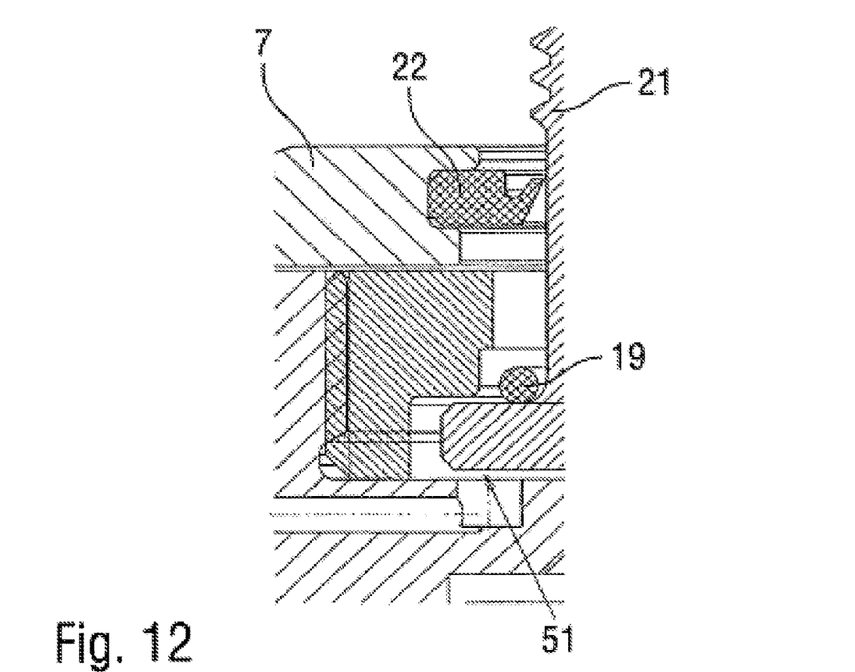
FIG. 12 shows a modification with an air cushion for facilitating the insertion of the thread.

FIGS. 11 and 12 show modifications which also largely correspond to the exemplary embodiments described above so that, for the avoidance of repetition, reference is made to the above description, wherein the same reference signs are used for corresponding details.

The peculiarity of FIG. 11 lies therein that the clamping bushing 21 rests underneath on an elastic ring 50, by which means the introduction of the thread of the clamping bushing 21 is facilitated.

The peculiarity of FIG. 12 lies therein that the clamping bushing 21 floats underneath on an elastic ring 50, by which means the introduction of the thread of the clamping bushing 21 is also facilitated.

Figure 13A:
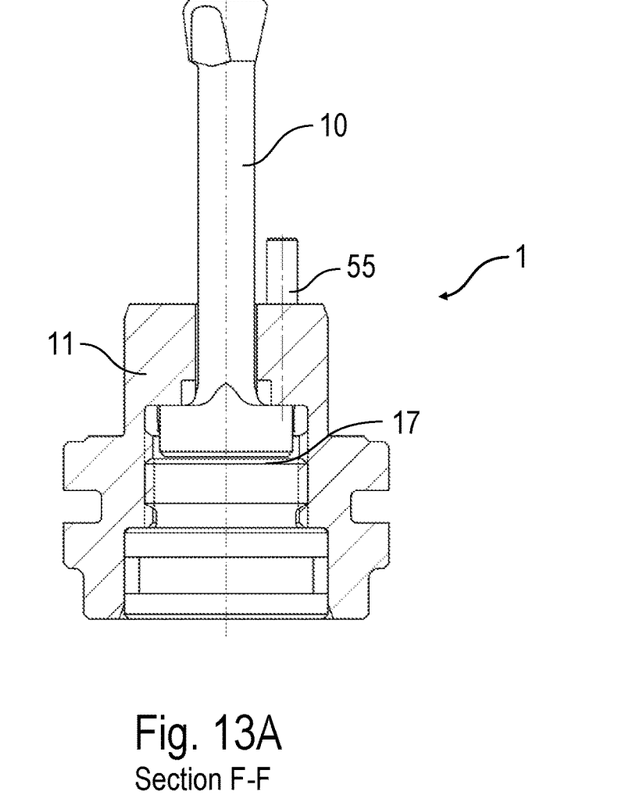
FIG. 13A shows a cross-sectional view through a further exemplary embodiment along the sectional line F-F in FIG. 13C, wherein the bayonet fastening has an antitwist protection and a rotation angle limitation.
Figure 13B:
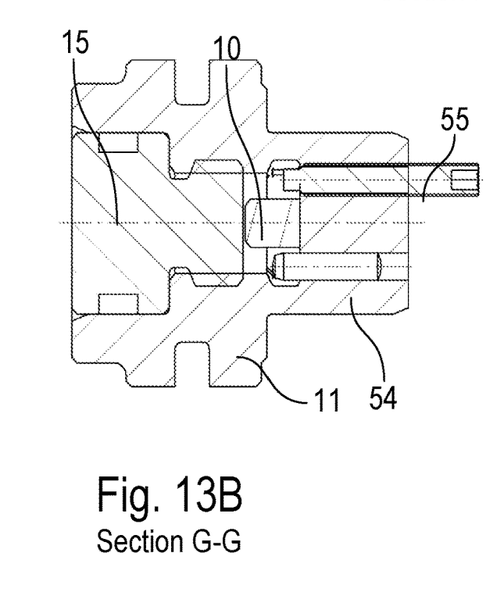
FIG. 13B shows a sectional view along the sectional line G-G in FIG. 13C.
Figure 13C:
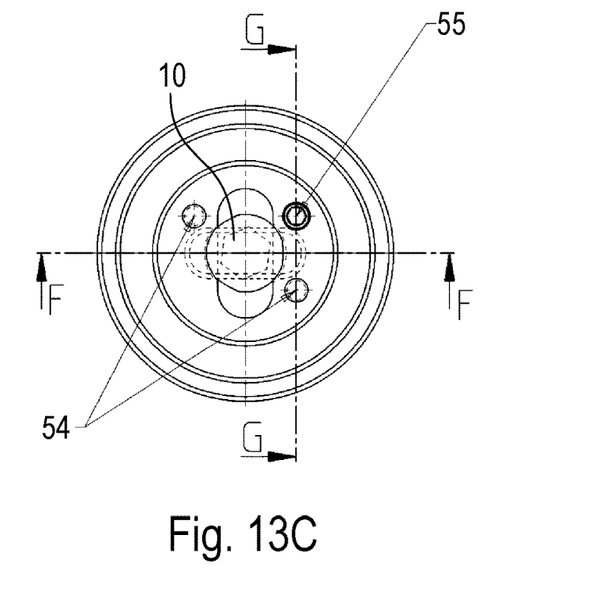
FIG. 13C shows a transverse sectional view of the exemplary embodiment according to FIGS. 13A and 13B.

FIGS. 13A-13C show different sectional views of a further exemplary embodiment which largely corresponds to the exemplary embodiments described above so that, for the avoidance of repetition, reference is made to the above description, wherein the same reference signs are used for corresponding details.

A peculiarity of this exemplary embodiment lies therein that the bayonet fastening has, between the hammer-shaped widening 17 of the tension rod 10 on one side, and the piston 11 on the other has a rotation angle limitation which consists of two pins 54 which are inserted into corresponding bores in the piston 11. On a rotation of the tension rod 10 about its longitudinal axis, the hammer-shaped widening 17 of the tension rod 10 makes contact with the pins 54, so that the rotation angle of the tension rod 10 is restricted.

A further peculiarity of this exemplary embodiment lies therein that the bayonet fastening has an antitwist protection (release protection) which hinders an unintended release of the bayonet fastening. The antitwist protection consists substantially of a further pin 55 which is also inserted into a corresponding bore in the piston 11. The pin 55 herein hinders the tension rod 10 from rotating into a position which permits the tension rod 10 to pull out of the piston 11. For the release of the bayonet fastening, therefore, the pin 55 must initially be removed. Subsequently, the tension rod 10 can then be rotated so that the bayonet fastening can be released.

The invention is not restricted to the above-described preferred exemplary embodiments. Rather a plurality of variants and modifications is possible which also make use of the inventive concept and therefore fall within the scope of protection. In particular, the invention also claims protection for the subject matter and the features of the subclaims separately from the claims to which they each refer. For example, the concept of a bayonet fastening according to the subclaims is also of independent significance worthy of protection without the feature of a thread connection according to the main claim.

REFERENCE SIGNS

1 Clamping device
2 Component
3 Blind bore
4 Inner wall of the blind bore
5 Internal thread of the blind bore
6 Housing of the clamping device
7 Housing cover
8 Housing base
9 Seal between housing base and housing
10 Tension rod
11 Piston
12 Seal between piston and housing
13 Seal between piston and housing
14 Through bore in piston
15 Piston insert
16 Spring for biasing the tension rod
17 Hammer-shaped widening of the tension rod
18 Internal part
19 O-ring for pre-centring the tension rod
20 Compression spring for biasing the clamping bushing against the pull-down movement
21 Clamping bushing
22 Scraper
23 Hydraulic connection for clamping the tension rod
24 Oil channel for clamping the tension rod
25 Oil channel for clamping the tension rod
26 Pressure chamber for clamping the tension rod
27 Plug
28 Hydraulic connection for relaxing the tension rod
29 Oil channel for relaxing the tension rod
30 Oil channel for relaxing the tension rod
31 Pressure chamber for relaxing the tension rod
32 Plug
33 Pneumatic connection for purge air device
34 Compressed air channel of the purge air device
35 Compressed air channel of the purge air device
36 Compressed air channel of the purge air device
37 Pressure chamber of the purge air device
38 Plug
39 Pneumatic connection of the interrogation device
40 Compressed air channel of the interrogation device (piston position monitoring)
41 Compressed air channel of the interrogation device
42 Compressed air channel of the interrogation device
43 Seating monitoring bore
44 Spring for intrinsic safety in the event of pressure loss
45 Collar of the clamping bushing
46 Ramp surface of the clamping bushing
47 Stationary ramp surface
48 Pressure channel interrogation relaxation position
49 Throttle/throttle bore
50 Elastic ring for height compensation
51 Bore for generating the air cushion
52 Pressure channel for pressure difference measurement
53 Projection for bayonet fastening (hammer of the tension rod)
54 Pins of the rotation angle limitation of the bayonet fastening
55 Pin of the antitwist protection (release protection)
a Axial play of the clamping bushing and of the internal part

The invention claimed is:

1. A clamping bushing being configured for clamping in a bore of a component,
   a) wherein in a relaxed state, the clamping bushing is radially contracted so that the clamping bushing can be introduced into the bore and pulled out of the bore,
   b) whereas in a clamped state, the clamping bushing is expanded radially, so that an envelope surface of the clamping bushing forms a mechanical connection with an inner wall of the bore,
   c) wherein the mechanical connection between the envelope surface of the clamping bushing and the inner wall of the bore is form-locking,
   d) further comprising an external thread in the envelope surface of the clamping bushing configured to engage in an internal thread in the inner wall of the bore to create the form-locking mechanical connection.

2. The clamping bushing according to claim 1, wherein
   a) the external thread of the clamping bushing and the internal thread of the bore have the same thread pitch, and
   b) the external thread of the clamping bushing has, in the radially contracted state, a smaller thread diameter than the internal thread of the bore, and
   c) the external thread of the clamping bushing in the radially expanded state has the same thread diameter as the internal thread of the bore, and
   d) in the radially contracted state of the clamping bushing, the outer diameter of the external thread of the clamping bushing is smaller than a core diameter of the internal thread of the bore.

3. The clamping bushing according to claim 1, wherein
   a) the clamping bushing comprises centrally an axial through bore for a tension rod, and
   b) the through bore widens radially toward a free end of the clamping bushing.

4. The clamping bushing according to claim 3, wherein the through bore widens conically.

5. A clamping device for mechanically clamping a component, comprising:
   a) an axially displaceable tension rod for clamping the component, and
   b) an axially displaceable piston for displacement of the tension rod, and
   c) the clamping bushing according to claim 1.

6. The clamping device according to claim 5, wherein the tension rod extends axially through the clamping bushing and has a widening at its free end, so that the tension rod radially expands the clamping bushing on retraction of the tension rod.

7. The clamping device according to claim 6, wherein in the radially contracted state of the clamping bushing, an outer diameter of the external thread of the clamping bushing is equal to a thread diameter of the internal thread, but due to segmentation of the clamping bushing, in the relaxed state, is smaller than a core diameter of the internal thread of the bore.

8. The clamping device according to claim 6, wherein in the radially contracted state of the clamping bushing, individual segments of the clamping bushing float on an air cushion and insertion of the thread is thus facilitated.

9. The clamping device according to claim 6, wherein in the radially contracted state of the clamping bushing, individual segments of the clamping bushing lie on an elastic ring and insertion of the thread is thus facilitated.

10. The clamping device according to claim 5, wherein
a) the clamping bushing has on its underside a conical ramp surface which narrows conically upwardly, and
b) the clamping bushing lies with its conical ramp surface on a conical ramp surface fixed in the clamping device, and
c) during a clamping procedure, the clamping bushing both expands radially and also, due to the ramp surfaces sliding over one another, is pulled axially downwardly.

11. A clamping device for mechanically clamping a component having a bore, comprising: a) an axially displaceable tension rod for clamping the component, b) an axially displaceable piston for displacement of the tension rod, c) a clamping bushing having an envelope surface, and d) a bayonet fastening for releasable mechanical anchoring of the tension rod in the piston; wherein the clamping bushing is radially contracted in a relaxed state and expanded in a clamped state, wherein an external thread is formed on the envelope surface of the clamping bushing, the external thread configured to engage in an internal thread in an inner wall of the bore to create a form-locking mechanical connection.

12. The clamping device according to claim 11, wherein the tension rod is releasable from the piston via axial movement thereof.

13. The clamping device according to claim 12, wherein the tension rod is exchangeable by use of the bayonet fastening, without opening fluid lines for the drive of the piston.

14. The clamping device according to claim 13, wherein
a) the tension rod has a hammer-shaped lateral widening at its lower end, and
b) for a passage of the tension rod, the piston has an axial bore which in cross-section is a slot, so that the hammer-shaped widening of the tension rod can be fed in a particular angular position of the tension rod through the axial bore and otherwise brings about a form-locking anchoring of the tension rod in the piston.

15. The clamping device according to claim 13, wherein the tension rod is biased against the piston by a first spring in order to prevent a falling out of the tension rod.

16. The clamping device according to claim 13, wherein the bayonet fastening has a rotation angle limitation in order to delimit a rotation angle of the tension rod.

17. The clamping device according to claim 16, wherein the rotation angle limitation has a rotation angle stop in each rotation direction.

18. The clamping device according to claim 17, wherein each rotation angle stop consists of a pin.

19. The clamping device according to claim 13, wherein
a) the bayonet fastening comprises an anti-twist protection to prevent unintentional release of the bayonet fastening, and
b) the anti-twist protection has a rotation angle stop which prevents a rotation of the tension rod into a release position, and
c) the rotation angle stop has a pin.

20. The clamping device according to claim 11, further comprising
a) a first pressure chamber for hydraulic or pneumatic pressure application on the piston for clamping the tension rod, and
b) a second pressure chamber for hydraulic or pneumatic pressure application on the piston for relaxing the tension rod, and
c) a second spring which biases the piston in a clamping position, so that the component is also held without a pressure application.

21. The clamping device according to claim 11, wherein the tension rod is releasable from the piston via rotational and axial movement thereof.

22. The clamping device according to claim 11, further comprising a purge air device to blow out purge air in a region of a seating around a free end of the tension rod.

23. The clamping device according to claim 11, wherein the clamping device has an elastic centering element for pre-centering of the tension rod.

24. The clamping device according to claim 23, wherein the centering element surrounds the clamping bushing and the tension rod in an annular manner.

25. The clamping device according to claim 23, wherein the centering element surrounds the tension rod in an annular manner and is arranged beneath the clamping bushing.

26. The clamping device according to claim 11, wherein a) the clamping bushing is mounted in the clamping device with an axial play so that the clamping bushing can carry out an axial pull-down movement, and b) a spring is provided for biasing the clamping bushing against the pull-down movement.

27. The clamping device according to claim 26, wherein the clamping bushing has at a bottom thereof a radially protruding collar and the spring surrounds the radially protruding collar externally and presses the radially protruding collar radially inwardly.

28. The clamping device according to claim 26, wherein the spring is arranged beneath the clamping bushing and presses the clamping bushing axially upwardly.

* * * * *